United States Patent [19]

Plesa

[11] Patent Number: 4,531,290

[45] Date of Patent: Jul. 30, 1985

[54] CUTTING TOOL FOR MANUAL GRAFTING

[75] Inventor: László Plesa, Szentendre, Hungary

[73] Assignee: "Aranykalasz" Mgtsz, Rackeve, Hungary

[21] Appl. No.: 617,469

[22] Filed: Jun. 5, 1984

[30] Foreign Application Priority Data

Jun. 17, 1983 [HU] Hungary ............................... 2174/83

[51] Int. Cl.³ ............................................. A01G 1/06
[52] U.S. Cl. ........................................... 30/178; 47/6
[58] Field of Search ................. 30/178, 179, 182, 184, 30/124; 47/6, 7

[56] References Cited

U.S. PATENT DOCUMENTS

| 219,403 | 9/1879 | Kingsbury | 30/178 |
| 285,910 | 10/1883 | McLennan | 30/178 |
| 645,922 | 3/1900 | Stelzl | 30/178 |
| 787,348 | 4/1905 | Hansen | 30/178 X |
| 2,899,744 | 8/1959 | Bjorklund et al. | 30/182 X |
| 4,098,020 | 7/1978 | Cook | 76/6 |
| 4,392,304 | 7/1983 | Plesa | 30/178 |

Primary Examiner—Jimmy C. Peters
Attorney, Agent, or Firm—Young & Thompson

[57] ABSTRACT

The invention relates to a cutting tool for manual grafting comprising a cutting element (1) with curved surface, a locating element (3) guided in a cutting direction (i) against the cutting element (1) for locating a plant part to be grafted and means for guiding the locating element (3) and fitting the cutting element (1), wherein the cutting element (1) on its convex surface is equipped with an edge and the cutting element (1) is shaped on the concave side under a relief angle ($\beta$) in the range from 0.5° to 3°, and on the convex side under a back slope ($\alpha_1$) in the range from 0.75° to 5°, both related to the cutting direction.

5 Claims, 4 Drawing Figures

B—B

C—C

CUTTING TOOL FOR MANUAL GRAFTING

This invention relates to a cutting tool for grafting in viniculture, aboriculture and horticulture.

Several devices have been developed for grafting in viniculture, aboriculture and horticulture. The HU-PS No. 179 082 and the DE-OS No. 26 02 316 specify these types. Said devices contain a cutting element which is able to produce the incision in the understock with one single cut, respectively, it becomes possible to cut the graft to an absolutely identical shape. Most frequently the knives are formed so, as to enable the grafting of an greek omega-profile, however, knives are also known, by the aid of which grafting in a U-shaped profile is also possible.

Said devices have considerably increased the productivity of grafting process, however, the result was far not satisfactory. Grafts having been made with said devices either did not take at all, and if, only half-sided. The reason for this is that stream of juice—being of utmost importance for the plants—begins only at a complete fitting of the understock and the graft. Complete fitting can be hindered even by faults seeming otherwise quite insignificant, as e.g. destruction of the grafts in course of grafting. Unfortunately the knives being presently in use destroy the grafts as the cutting element is sharpened slantwise on both sides, accordingly, in addition to shearing, the grafts are elastically deformed and bent. Due to deformation and bending the graft will be destroyed and shape of grafting will be inaccurate.

The aim of the invention is to develop a cutting tool for grafting by the aid of which grafting can be performed without destruction and conformally and with time savings.

The invention is based on the recognition, in so far as—although pure shearing could be obtained by forming the knife with a relief angle of 0°—due to the deformation of the graft, in course of forming the grinding angle relative change of the grinding angle is also to be considered.

Accordingly, the invention relates to a cutting tool for manual grafting comprising a cutting element with curved surface, a locating element guided in a cutting direction against the cutting element for locating a plant part to be grafted and means for guiding the locating element and fitting the cutting element, wherein the cutting element on its convex surface is equipped with an edge and the cutting element is shaped on the concave side under a relief angle in the range from 0.5° to 3° and on the convex side under a back slope angle in the range from 0.75° to 5°, both related to the cutting direction.

In an advantageous embodiment the cutting element is shaped with an edge band on the concave side lying under back slope angle in the range from 10° to 45° related to the cutting direction, wherein it is especially desired to limit.

In a further advantageous embodiment of the proposed cutting tool for grafting the end parts of the cutting element are fixed in a holding element between parallel planes and the thickness of the cutting element in the holding element is greater than its thickness at its cutting edge. It is particularly advantageous, if the cutting element is arranged symmetrically to a plane lying perpendicular to the parallel planes of the holding.

When grafting the grafts with the cutting element shaped according to the invention a pure shearing process is taking place even if the graft became deformed. This possibility is yielded by the relief angle previously described. As it is to be seen, the stub cut has a faultless and well-shaped surface, however, at the fork cut certain differences may arise, but these do not deteriorate the quality of grafting, as the fork is able to get deformed to the required extent, so eventual faults of grafting can be corrected.

The invention will be described by the way of a preferred embodiment serving as an example, by means of the drawing enclosed, wherein.

The tool can be used for preparing all kinds of graftings for example, those for vine, fruit or ornamental shrubbery and graftings may be prepared indoors in winter, in the spring on the spot and in addition to these greengrafting or propagation by cutting are possible.

Figure 1:
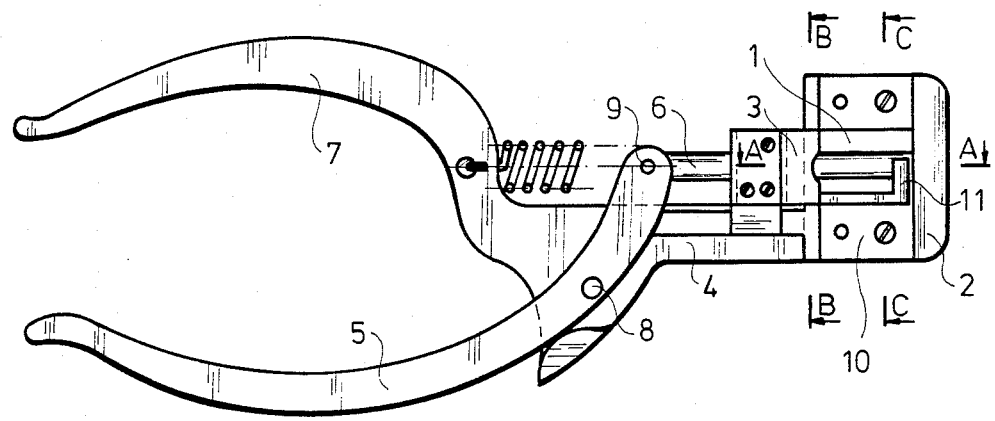
FIG. 1 is a side view of the cutting tool according to the invention.

As shown in FIG. 1 a cutting tool according to this invention has first and second longitudinal members, 7, 5, having a common pivot 8. On one side of the pivot the longitudinal members are curved to serve as handles (they may have any conventional shape); between the curved portion of the first member 7 and the pivot 8 there is an off-set portion with a rounded projecting piece housing the pivot 8, the offset portion extending in the form of a straight guide portion 4, on the other side of the projecting piece. The end of the guide portion 4 remote from the pivot is perpendicularly bent over and forms a holder 2 for a cutting element 1 having an edge.

A pin is located in a bore in the projecting piece for serving as the pivot. The second member 5 can be rotated about the pivot 8 relative to the first member 7. The second member 5 extends from the pivot 8 at an angle to the handle thereof and the end of this extension remote from the pivot 8 is round and clevis-shaped and houses a bore through which a pin passes for connecting an end of an arm 6 to the extension. A spring has one end attached to the first member 7 where the curved handle portion meets the off-set portion and the other end attached to pin 9. Movement of the second member about pivot 8 thus induces to-and-fro movement of the arm 6 against the spring.

Along the whole length of the guide portion 4 there is a groove (not numerated) for guiding a movable locating element 3, fixed to the end of the arm 6 remote from the pin 9, by means of a further pin (not shown). The locating element 3 has a through-shaped cut-away piece surface in each side at the remote from arm 6 and an interior recess.

On each side of the locating element 3 there is an L-shaped piece 11 for separating an understock and the pieces of plant cut out by an edge comprising two parallel spaced apart blades which are fixed to the holder 2 of the first member 7 by means of screws. The cross-section of the edge is shown in the further figures.

The movable second member 5 can be kept in a fixed, closed position by using a conventional protection plate which abuts part of the projection in the closed position.

Figure 2:
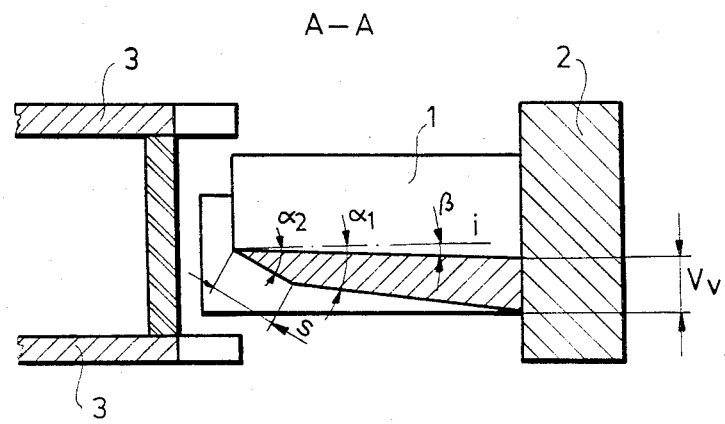
FIG. 2 shows the cross-section A—A.
Figure 3:
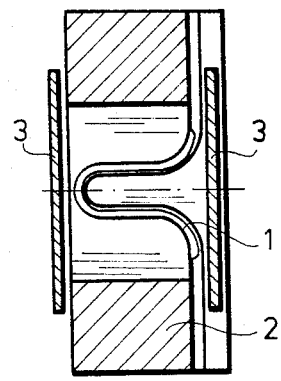
FIG. 3 shows the cross-section B—B.
Figure 4:
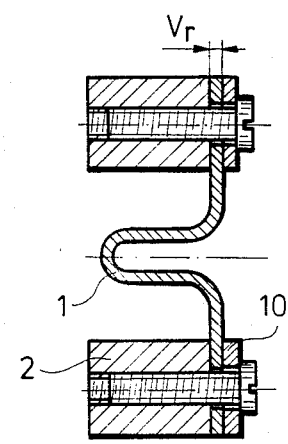
FIG. 4 shows the cross-section C—C of the proposed cutting tool for grafting.

As it can be seen in FIG. 3 or 4, the edge of the cutting element 1 is bent to a U-shaped form in the usual manner. Obviously it can be shaped also in form of the greek omega or other. Therefore the edge has an inner (concave) and an outer (convex) side. In the cutting direction shown by i in FIG. 2 the edge is ground.

The cutting element 1 is placed between parallel planes in a holding element 10. The thickness of the edge is $V_r$ in the holding element and its value is at least so great than the thickness $V_y$ of the cutting element 1 in the edging portion (FIG. 2). In this way the significant shearing and torsion stresses arising during cutting in the fixing part, in the holding element 10 of the cutting element 1 can be avoided. These stresses are able to break easily the holding element 10 which is weakened by bores and narrow parts. As a consequence it can be seen from the FIG. 4 it is advantageous to maintain the original thickness of the plate at the holding element 10. Practically it means that thickness $V_r$ should correspond at least the greatest thickness $V_y$ of the cutting element 1.

The cross-section of the cutting element 1 in cutting direction i is shown in FIG. 2. The concave side of the cutting element 1 encloses a relief angle $\beta$ with the cutting direction i, while the convex side a back slope angle $\alpha_1$. Expediently the relief angle $\beta$ lies in the range from 0.5° to 3° and the back slope angle $\alpha_1$ in the ragne from 0.75° to 5°. Lower values belong to thicker and stiffer grafts, while the higher ones are chosen for the thinner and more flexible grafts.

It is clear that the graft is bending opposite to the cutting element and becomes deformed; accordingly angle of the declination of the grinding angle has to be compensated, too. It seems to be expedient to grind the edge to an edge-band with a back slope angle $\alpha_1$ in range from 10° to 45°, however, these values have not be strictly kept. With lower angle values the knife becomes quickly worn, while with higher than 45° values the graft will be considerably destructed. The width s of the edge-band should not surpass 2 mm, unless difficulties in cutting and destruction of the grafts are not to be avoided. The way of operating of the cutting tool for grafting is the following:

On releasing the protective plate, the spring acts to pull the arm 6 downwards and the movable second member 5 moves away from the first member 7. As a consequence of the downward movement of the spring, the clevis-shaped element holding the locating element 3 is guided together with the locating element 3 by the groove downwards towards the handles.

The understock is then placed in the space between the depressed locating element 3 and the cutting element 1, and over the cut-away piece end of the locating element 3. At the same time, the second member 5 is manually pushed back towards the first member 7 against the force of the spring and the spring then moves the arm 6, the clevis-shaped element and locating element 3 towards the cutting element 1, and a U-shaped cutting edge of the blade cuts off a graft as desired. By repeatedly opening and closing members 5, 7 L-shaped pieces 11 help to take the understock off the blade. The graft is removed by means of the locating element 3.

Operation of the device requires a force of 40 N, and so workers can operate it without difficulty.

Pieces cut using the tool according to this invention can be accurately grafted and the procedure is much more efficient than those involving the use of the conventional tools.

I claim:

1. Cutting tool for manual grafting comprising a cutting element with curved surface, a locating element guided in a cutting direction against the cutting element for locating a plant part to be grafted and means for guiding the locating element and fitting the cutting element, wherein the cutting element on its convex surface is equipped with an edge and the cutting element is shaped on the concave side under a relief angle in the range from 0.5° to 3°, and on the convex side under a back slope angle in the range from 0.75° to 5°, both related to the cutting direction.

2. Cutting tool for grafting according to claim 1, wherein the cutting element is shaped with an edge band on the concave side lying under back slope angle in the range from 10° to 45° related to the cutting direction.

3. Cutting tool for grafting according to claim 2, wherein the width of the edge band is under 2 mm.

4. Cutting tool for grafting according to claim 1, wherein the end parts of the cutting element are fixed in a holding element between parallel planes and the thickness of the cutting element in the holding element is greater than its thickness at its cutting edge.

5. Cutting tool for grafting according to claim 4, wherein the cutting element is arranged symmetrically to a plane lying perpendicular of the parallel planes of the holding element.

* * * * *